United States Patent
Davis

[11] Patent Number: 6,105,195
[45] Date of Patent: Aug. 22, 2000

[54] COFFEE BASKET BRUSH

[75] Inventor: Tommy Douglas Davis, P.O. Box 1086, Midland City, Ala. 36350

[73] Assignee: Tommy Douglas Davis, Midland City, Ala.

[21] Appl. No.: 09/246,520

[22] Filed: Feb. 8, 1999

[51] Int. Cl.[7] .................................................. A46B 5/02
[52] U.S. Cl. ......................................... 15/160; 15/143.1
[58] Field of Search ................................. 15/143.1, 160, 15/167.1

[56] References Cited

U.S. PATENT DOCUMENTS

| | | | |
|---|---|---|---|
| 876,185 | 1/1908 | Hillman | 15/167.1 |
| 1,477,390 | 12/1923 | Sloan | 15/167.1 |
| 1,500,722 | 7/1924 | Roush | 15/167.1 |
| 1,632,102 | 6/1927 | Vatcher | 15/167.1 |
| 1,901,866 | 3/1933 | Bryan | 15/167.1 |
| 2,241,584 | 5/1941 | Cohen | 15/167.1 |
| 4,274,174 | 6/1981 | Ertel | 15/167.1 |

FOREIGN PATENT DOCUMENTS

| | | | |
|---|---|---|---|
| 2752118 | 5/1979 | Germany | 15/167.1 |
| 0013994 | 6/1914 | United Kingdom | 15/167.1 |
| 0249193 | 3/1926 | United Kingdom | 15/167.1 |
| 9107114 | 5/1991 | WIPO | 15/167.1 |

*Primary Examiner*—Randall E. Chin

[57] ABSTRACT

A coffee basket brush for cleaning a coffee basket that holds filters for brewing is comprised of an elongated handle having a length of 11.27 mm wherein the brush head bends at an angle to the handle. The length of the brush head from the end of the brush head to the bend is 3.08 mm. The brush head is filled with multiple soft bristles wherein the brush head has 34 holes to be filled with these multiple soft bristles. The handle is shaped for easy gripping for usage.

1 Claim, 1 Drawing Sheet

COFFEE BASKET BRUSH

FIELD OF THE INVENTION

The present invention relates generally and specially to coffee basket brushes to clean these and other baskets of this type that need to be cleaned.

BACKGROUND OF THE INVENTION

The present invention relates to a cleaning brush capable of providing unobstructive visual access of the bristle matrix when cleaning coffee filter baskets and other type baskets that need periodic cleaning. The coffee basket brushes can be for household and commercial use. Coffee baskets and other baskets that require filters should have a brush to clean the grooves that is easy to use and grip.

SUMMARY OF THE INVENTION

It is an object of the present invention to provide a cleaning brush which has an ergonomically designed handle that is at a bend to the brush head. The handle design makes it possible to reach tiny grooves in coffee baskets and other type baskets where filters are used for brewing.

DESCRIPTION OF THE PREFERRED EMBODIMENT

This coffee basket brush is a brush angled to fit coffee baskets that hold filters. It is angled to fit into the filter baskets to clean the crevices where tiny deposits and film cling to the side and bottom of these filter baskets. The brush has a wide brush head with 34 hole fillings which hold soft bristles that facilitate cleaning of filter baskets. The coffee basket brush has a bend and is angled at an obtuse angle for fitting into the baskets. The coffee basket brush is injection-molded for manufacturing. The coffee basket brush handle will be a brown color. The coffee basket brush will benefit coffee drinkers that use filter baskets in that it will be easy to clean with no hazard to our health. The coffee basket brush will improve cleaning capabilities on hard-to-reach areas of the filter baskets.

Figure 2:
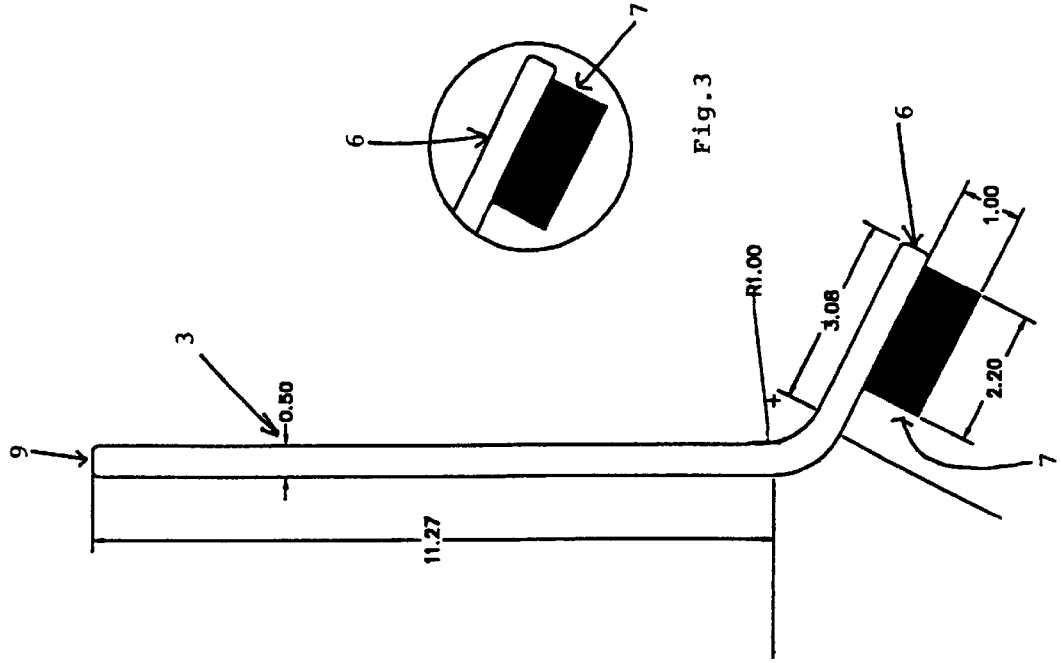
FIG. 2 is a side view of the coffee basket brush of the present invention.

A preferred form of the coffee basket brush 9 in accordance with the present invention is illustrated in FIG. 2 and comprises a handle 3 with bristles 7.

Figure 4:
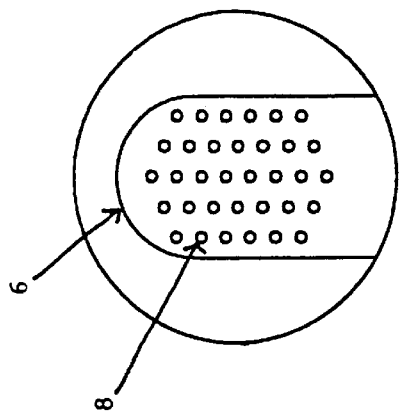
FIG. 4 is a perspective view of the bottom of the brush head showing the bristle holes of the coffee basket brush of the present invention.
Figure 3:
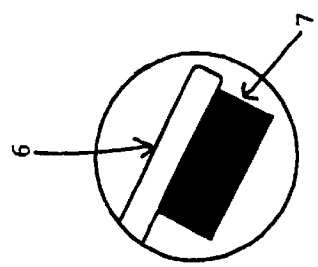
FIG. 3 is a side view of the brush head of the coffee basket brush of the present invention.
Figure 1:
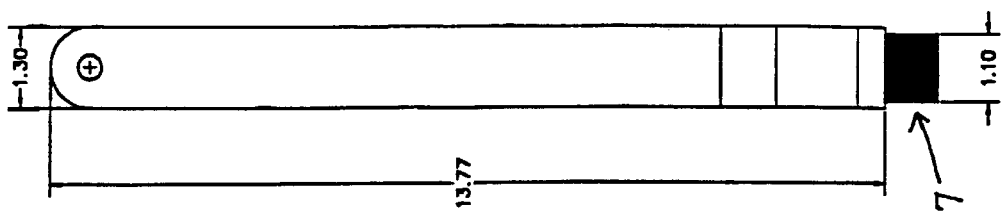
FIG. 1 is a perspective view of the front of the handle of the coffee basket brush of the present invention.

FIG. 1 shows the total elongated length of the brush from a front view is 13.77 mm and that the width is 1.30 mm. FIG. 2 shows the handle has a thickness of 0.50 mm and the elongated handle 3 has a length of 11.27 mm from the proximal end of the elongated handle 3 to the angled bend. FIG. 2 also shows the brush head 6 bends at an obtuse angle to the handle 3. The brush head length measures 3.08 mm from the end of the brush head to the bend and the height of the bristles from the top surface of the brush head to their free ends is 1.00 mm as shown in FIG. 2. FIG. 3 is a side view of the brush head 6 with bristles 7. FIG. 4 shows the bottom of the brush head 6 with 34 holes 8 for receiving the bristles 7.

What is claimed is:

1. An injection-molded coffee basket brush having proximal and distal ends comprising an elongated handle connected to a brush head having a plurality of bristles attached thereto and wherein there is an angled bend between the brush head and the elongated handle such that the brush head is bent at an obtuse angle to the elongated handle, and further wherein the total elongated length of the brush from a front view is 13.77 mm, the width of the brush is 1.30 mm, the brush has a thickness of 0.50 mm and a length of 11.27 mm from the proximal end of the brush to the angled bend, the brush head has a length of 3.08 mm from the distal end of the brush to the angled bend, and the height of the bristles from the top surface of the brush head to their free ends is 1.00 mm.

* * * * *